(12) United States Patent
Ikeda et al.

(10) Patent No.: US 11,148,702 B2
(45) Date of Patent: Oct. 19, 2021

(54) DAMPER STRUCTURE PROVIDED IN STEERING WHEEL OF VEHICLE

(71) Applicants: AUTOLIV DEVELOPMENT AB, Vargarda (SE); HONDA MOTOR CO., LTD., Tokyo (JP)

(72) Inventors: Takanori Ikeda, Kanagawa (JP); Shoma Fushimi, Kanagawa (JP); Eisuke Kurata, Saitama (JP); Yosuke Iwasaki, Gifu (JP)

(73) Assignees: AUTOLIV DEVELOPMENT AB, Vargarda (SE); HONDA MOTOR CO., LTD., Tokyo (JP)

( * ) Notice: Subject to any disclaimer, the term of this patent is extended or adjusted under 35 U.S.C. 154(b) by 22 days.

(21) Appl. No.: 16/581,888

(22) Filed: Sep. 25, 2019

(65) Prior Publication Data
US 2020/0101997 A1 Apr. 2, 2020

(30) Foreign Application Priority Data
Sep. 28, 2018 (JP) .............................. JP2018-185689

(51) Int. Cl.
*B62D 1/11* (2006.01)
*B62D 7/22* (2006.01)

(52) U.S. Cl.
CPC ................ *B62D 1/11* (2013.01); *B62D 7/222* (2013.01)

(58) Field of Classification Search
CPC .................................. B62D 1/11; B62D 7/222
See application file for complete search history.

(56) References Cited

U.S. PATENT DOCUMENTS

| 2013/0239739 | A1* | 9/2013 | Miyahara | ............ B60R 21/2037 74/552 |
| 2015/0210308 | A1* | 7/2015 | Onohara | ............ B60R 21/2037 200/61.54 |

FOREIGN PATENT DOCUMENTS

| JP | 2011-195048 | A | 10/2011 | |
| JP | 2019-182360 | | * 10/2019 | ............... B62D 1/04 |

* cited by examiner

Primary Examiner — Vicky A Johnson
(74) Attorney, Agent, or Firm — Dickinson Wright PLLC

(57) ABSTRACT

A damper structure provided in a steering wheel of a vehicle to be able to achieve an improved effect of reducing vibration in a low frequency region and structurally prevent noise generation. The damper structure includes a plate member which faces the steering wheel and to which an airbag module is to be attached, an insulator attached to the plate member, a connector inserted into the insulator and having one end fixed to the steering wheel to be oscillated by vibration of the steering wheel, an elastic member surrounding the connector in the insulator, a ring provided with the elastic member to transmit the oscillation of the connector to the elastic member, a stopper provided around another end of the connector to face the elastic member, and a coil spring which brings the elastic member of the insulator into pressure contact with the stopper.

9 Claims, 7 Drawing Sheets

Z-AXIS DIRECTION

DAMPER STRUCTURE PROVIDED IN STEERING WHEEL OF VEHICLE

CROSS-REFERENCE TO RELATED APPLICATION

This application claims the benefit of priority under 35 U.S.C. § 119 to Japanese Patent Application No. 2018-185689, filed Sep. 28, 2018, the contents of which are incorporated herein by reference in their entirety.

BACKGROUND

The present invention relates to a damper structure provided in a steering wheel of a vehicle, which can achieve an improved effect of reducing vibration in a low frequency region and structurally prevent noise generation.

DESCRIPTION OF THE RELATED ART

With regard to a damper structure provided in a steering wheel of a vehicle to damp vibration of the steering wheel using an airbag module serving as a mass damper, for example, a disclosure of Japanese Patent Application Publication No. 2011-195048 is known.

The above-referenced Japanese Patent Application Publication No. 2011-195048 aims at preventing vibration of a steering wheel at a plurality of frequencies in a plurality of directions using a simple configuration. In the vibration damping structure for the steering wheel, a supporting member disposed on a vehicle front side of an inflator is caused to support the inflator via a rubber damper to allow the inflator to function as a mass damper of a dynamic damper. The rubber damper has a cylindrical shape and includes a damper main body disposed between a flange portion of the inflator and the supporting member such that a center axis line of the damper main body extends in a front-rear direction and a rib having, as a proximal end surface, one end surface in a direction along the center axis line and outwardly protruding from a portion of an outer peripheral surface of the damper main body in a peripheral direction thereof, while the proximal end surface is in contact with or close to the supporting member.

A conventionally known damper is structurally disadvantageous in that an effect of reducing vibration in a low frequency region obtained therefrom is not sufficient or noise is generated or the probability of noise generation is high. Accordingly, it is required to eliminate such a disadvantage.

SUMMARY OF THE INVENTION

The present invention has been achieved in view of the conventional problems described above, and it is therefore an object of the present invention to provide a damper structure provided in a steering wheel of a vehicle which can achieve an improved effect of reducing vibration in a low frequency region and structurally prevent noise generation.

A damper structure provided in a steering wheel of a vehicle according to the present invention is a damper structure provided in a steering wheel of a vehicle to damp vibration of the steering wheel using an airbag module serving as a mass damper, the damper structure including: a plate member which is provided to be spaced apart from and face the steering wheel and to which the airbag module is to be attached; an insertion hole formed in the plate member; a hollow cylindrical insulator inserted through the insertion hole and attached to the plate member; a connector inserted into the insulator such that a gap is formed therearound and oscillated at least in a direction along a wheel surface of the steering wheel by the vibration of the steering wheel; an elastic member formed to have a hollow cylindrical shape and provided in the insulator so as to surround the connector; a ring provided around an inner periphery of the elastic member to be integral with the elastic member, the ring being in slidable contact with an outer periphery of the connector to transmit the oscillation of the connector to the elastic member; a disk-shaped stopper provided around another end of the connector so as to face the elastic member; and a spring provided between the insulator and the steering wheel to resiliently bias the elastic member of the insulator so as to bring the elastic member into pressure contact with the stopper.

It is preferable that the damper structure provided in the steering wheel of the vehicle further includes: a clearance set in association with the ring between an outer peripheral surface of the elastic member and an inner peripheral surface of the insulator to allow the elastic member to be elastically deformed only in a predetermined amount in the direction along the wheel surface in accordance with the oscillation of the connector; a holding portion provided at a position in the insulator at which the clearance is absent to hold the elastic member with respect to the insulator; a plurality of notched portions formed around the insertion hole of the plate member to extend outwardly from the insertion hole; restricted portions provided around an outer periphery of the insulator so as to be inserted into the notched portions and movable in the notched portions as the insulator is operated to rotate in a peripheral direction in the insertion hole until movement of the restricted portions is restricted by the plate member; and engagement portions provided around the outer periphery of the insulator so as to be adjacent to the restricted portions and removably engaged with the notched portions in response to the restriction of the movement of the restricted portions to fix the insulator to the plate member.

It is preferable that the plate member is a horn plate. It is preferable that the spring is a horn spring.

It is preferable that the holding portion is a protruding portion provided at the insulator so as to fit into a depressed portion formed on an inner peripheral side of the elastic member.

The damper structure provided in the steering wheel of the vehicle according to the present invention can achieve an improved effect of reducing vibration in a low frequency region and structurally prevent noise generation.

DESCRIPTION OF THE PREFERRED EMBODIMENTS

Figure 1:
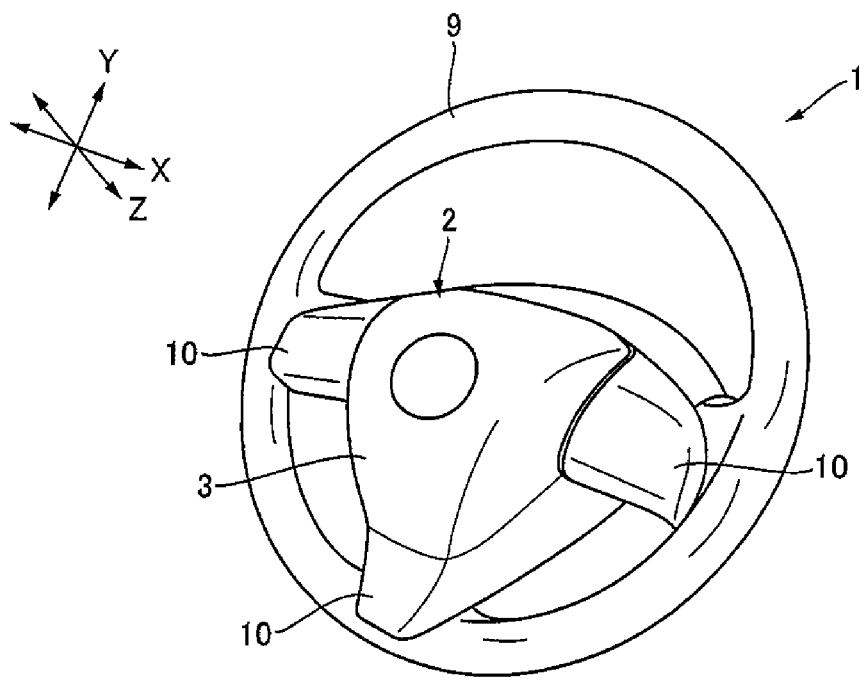
FIG. 1 is a schematic overall perspective view of an example of a steering wheel to which a damper structure provided in a steering wheel of a vehicle according to the present invention is applied.
Figure 2:
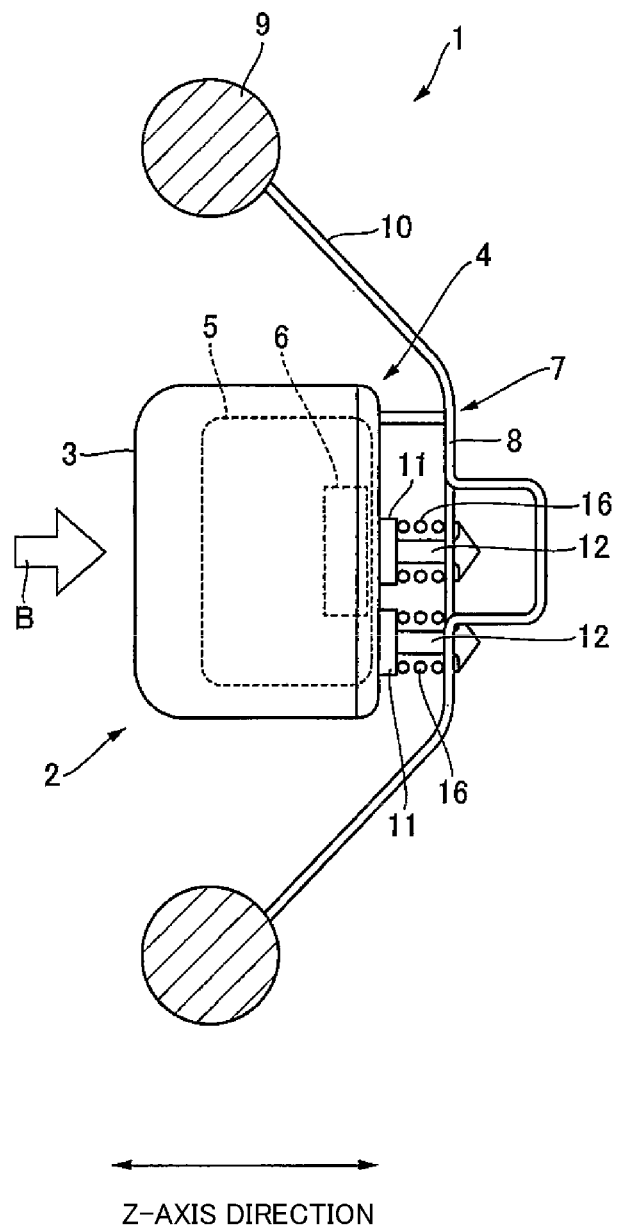
FIG. 2 is a side view showing a preferred embodiment of the damper structure provided in the steering wheel of the vehicle according to the present invention.

Referring to the accompanying drawings, the following will describe a preferred embodiment of a damper structure provided in a steering wheel of a vehicle according to the present invention in detail. FIGS. 1 and 2 are views illustrating an outline of a steering wheel 1 to which a damper mechanism provided in the steering wheel of the vehicle according to the present invention is applied.

FIG. 1 illustrates a perspective view of the entire steering wheel 1. FIG. 2 illustrates a side cross-sectional view of the entire steering wheel 1. Note that the drawings described below including FIG. 1 illustrate individual directions on the assumption that a steering position of the steering wheel 1 attached to the vehicle is neutral. For example, it is assumed that a downward direction along a Z-axis corresponds to a direction in which a steering column (steering shaft) not shown extends toward a front wheel of the vehicle, while an upward direction along the Z-axis corresponds to a direction toward the steering wheel 1.

It is also assumed that, in a plane perpendicular to the Z-axis, a position corresponding to 12 o'clock of an analog twelve-hour clock corresponds to a vehicle front side, a 9 o'clock direction (leftward direction) and a 3 o'clock direction (rightward direction) correspond to an X-axis, and a 6 o'clock direction (rearward direction) and a 12 o'clock direction (frontward direction) correspond to a Y-axis direction. In addition, a side viewed from a driver is referred to as a front side, while a side opposite to the front side is referred to as a rear side.

The steering wheel 1 is disposed in a driver seat of a vehicle and connected to the steering shaft extending through an inner portion of the steering column not shown to transmit a force resulting from an operation by the driver to a steering gear and the like.

To a center of the steering wheel 1, an airbag module 2 which functions as a front airbag in the event of an emergency is attached. In normal times, the airbag module 2 is movable and functions also as a horn switch (indicated by an arrow B in the drawing) to be depressed by the driver to sound a horn, though a description thereof is omitted.

A driver side of the airbag module 2 is covered with a horn cover 3 made of a resin to function as a design surface. At the back of the horn cover 3, a plate member 4 molded into a dish shape is provided. In the horn cover 3, an airbag cushion 5 which is deployed and inflated in the event of an emergency is folded up and contained. To the plate member 4, an inflator 6 provided to be contained in an airbag cushion 5 is attached.

When a signal is transmitted from a sensor of the vehicle in the event of an emergency, an inflator gas is supplied from the inflator 6 to the airbag cushion 5, and the airbag cushion 5 cleaves the horn cover 3 to be deployed and inflated into an inner space of a vehicle compartment to constrain the driver.

A base portion of the steering wheel 1 is formed of a cored bar member 7 made of a metal. The cored bar member 7 is generally configured to include a center boss area 8, a circular rim 9 to be held by the driver, and spokes 10 connecting the boss area 8 and the rim 9. To the boss area 8, the steering shaft is connected.

The airbag module 2 has, in addition to a function of the front airbag, a function of the horn switch as described above, and a function of a mass damper of a damper which attenuates vibration of the steering wheel.

Referring to FIGS. 3 to 7, a detailed description will be given of a damper structure provided in the steering wheel of the vehicle according to the present embodiment. The damper structure which damps the vibration of the steering wheel 1 in three dimensional directions, i.e., the X-axis direction, the Y-axis direction, and the Z-axis direction is provided to be embedded between the airbag module 2 and the steering wheel 1 to damp the vibration of the steering wheel 1 using the airbag module 2 serving as the mass damper.

The plate member 4 made of a metal to which the inflator 6 of the airbag module 2 including the airbag cushion 5 and the inflator 6 is to be attached is provided to be spaced apart from and face the boss area 8 of the steering wheel 1. Consequently, the airbag module 2 is disposed, while being surrounded by the rim 9.

Figure 3:
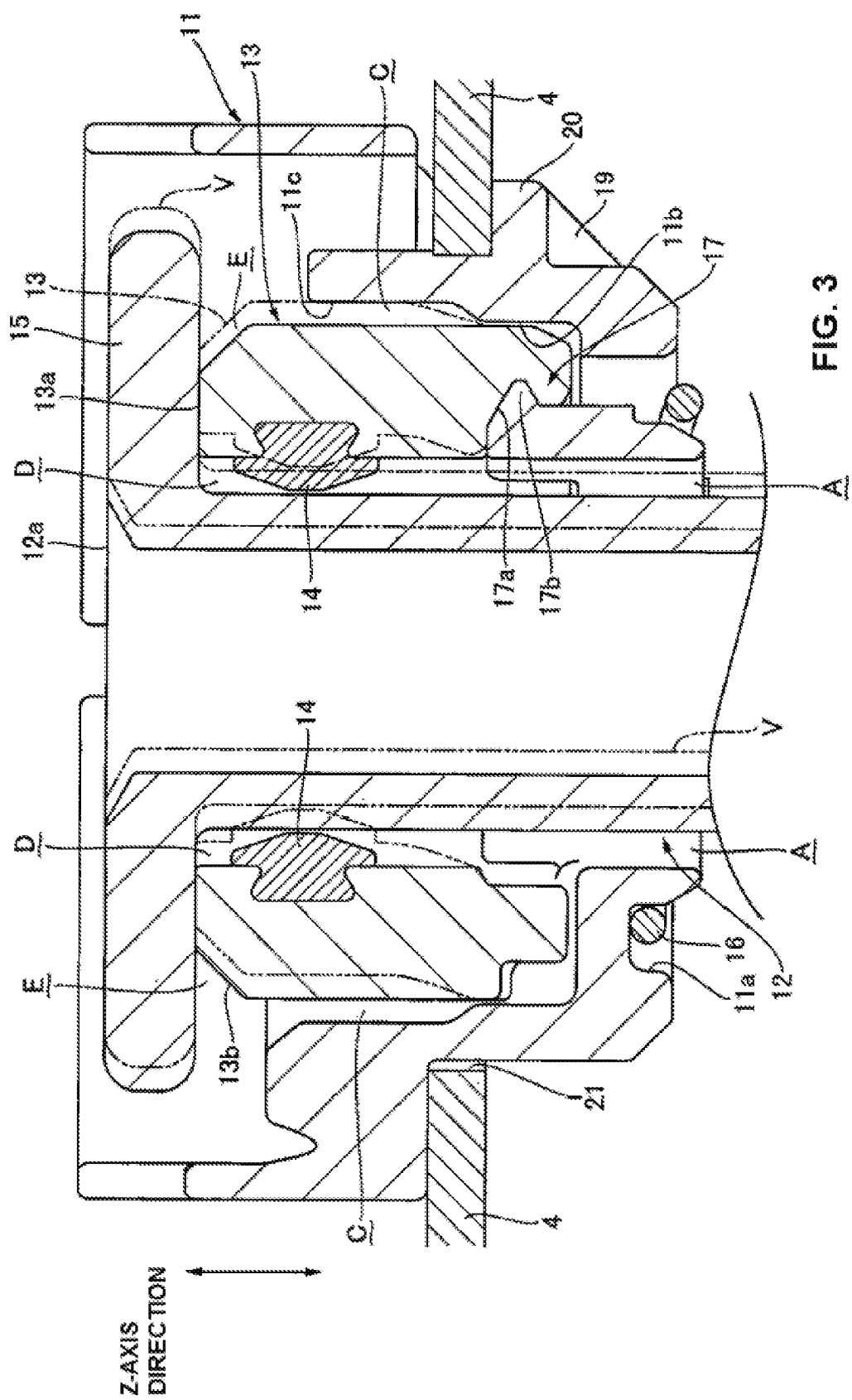
FIG. 3 is an enlarged side cross-sectional view of a main portion of the embodiment shown in FIG. 2.
Figure 4:
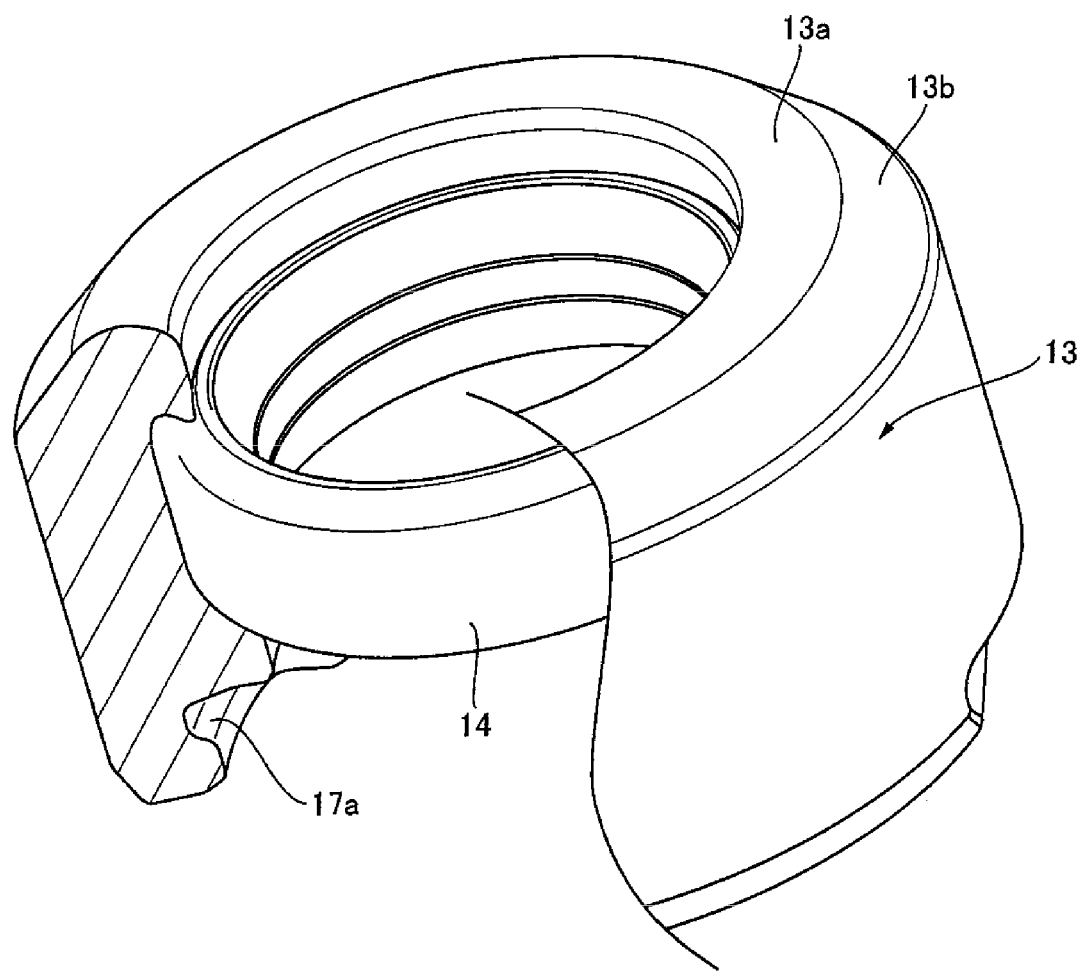
FIG. 4 is a partially broken perspective view showing a configuration of an elastic member and a ring of the embodiment shown in FIG. 2.
Figure 5:
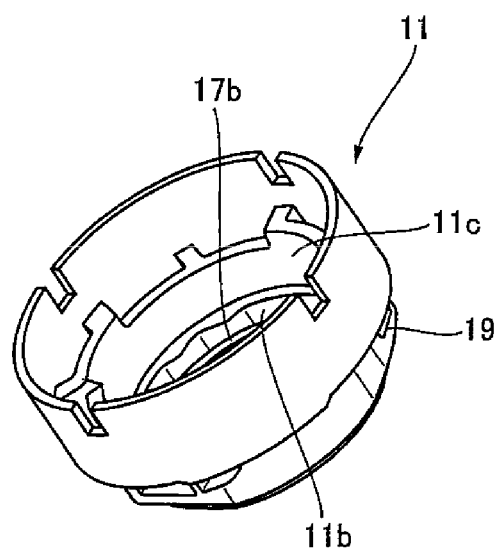
FIG. 5 is a perspective view showing an insulator of the embodiment shown in FIG. 2.

As shown in FIG. 3, in the plate member 4, insertion holes 21 are formed to extend therethrough in the Z-axis direction. The plurality of, e.g., two or three insertion holes 21 are formed to be spaced apart from each other along a peripheral direction of the rim 9.

In each of the insertion holes 21, a hollow cylindrical insulator 11 made of a synthetic resin is inserted along the Z-axis direction and thus attached to the plate member 4. The insulator 11 is formed to have a stepped outer shape so as to be engaged with a front side of the plate member 4 when inserted into the insertion holes 21. One end of the insulator 11 protrudes from the plate member 4 toward the steering wheel 1, while the other end of the insulator 11 protrudes from the plate member 4 toward the airbag module 2.

In the boss area 8 of the steering wheel 1, hollow shaft-shaped connectors 12 made of a metal or a synthetic resin are provided.

Each of the connectors 12 has one end closer to the steering wheel 1 which is provided to be fixed to the boss area 8 and another end 12a opposite to the one end which is provided upright with an axial direction thereof extending in the Z-axis direction so as to protrude toward the plate member 4 (airbag module 2).

Each of the connectors 12 is inserted into the boss area 8 to extend from the airbag module 2 in the Z-axis direction. The one end of the connector 12 is fixed to the steering wheel 1. As will be understood from a configuration described later, the connectors 12 are fixed to the boss area 8 to connect the airbag module 2 and the steering wheel 1 via the plate member 4 including the insulator 11.

The connectors 12 provided in the steering wheel 1 is oscillated (shown by two-dot-dash lines V in the drawing) in a direction along a wheel surface of the steering wheel by the vibration of the steering wheel 1, which is a plane in an X-Y axis direction, while being displaced in the Z-axis direction.

Each of the connectors 12 is inserted into the insulator 11 such that a gap A is formed therearound. As a result, the connector 12 is surrounded by the insulator 11. Specifically, the connector 12 is inserted in the insulator 11 to extend through the plate member 4, while being spaced at the distance A from an inner peripheral surface of the hollow cylindrical insulator 11 in the direction along the wheel surface.

In the insulator 11, a hollow cylindrical elastic member 13 is provided to be contained therein, while being located in an annular space between the inner peripheral surface of the insulator 11 and an outer peripheral surface of the connector 12 so as to surround the connector 12. The elastic member 13 is formed of a rubber. The elastic member 13 is also provided such that an inner peripheral surface thereof is spaced at a distance D from the outer peripheral surface of the connector 12 in the direction along the wheel surface.

Around the inner peripheral surface of the elastic member 13 facing the connector 12, a ring 14 made of a synthetic resin or a metal is provided to slidably come into contact with the outer peripheral surface of the connector 12. The ring 14 is provided to protrude from the elastic member 13 toward the connector 12.

The ring 14 transmits, to the elastic member 13, the oscillation of the connector 12 in the direction along the wheel surface. The ring 14 slidably comes into contact with the connector 12 to permit the connector 12 to be displaced in the Z-axis direction. The ring 14 is integrally provided with the elastic member 13 by an integral molding method such as an in-mold method. Alternatively, the ring 14 may also be provided integrally with the elastic member 13 using a mechanical configuration such as provided by fitting. The elastic member 13 provided with the ring 14 is elastically deformed in accordance with the oscillation of the connector 12 to absorb the oscillation and damp the vibration.

Around the other end 12a of the connector 12 closer to the airbag module 2, a disk-shaped stopper 15 is integrally provided to face an end surface 13a of the elastic member 13 contained in the insulator 11. As a result, the stopper 15 is provided to face the elastic member 13 in the Z-axis direction.

Between a spring sheet 11a of the insulator 11 closer to the steering wheel 1 and the boss area 8, coil springs 16 are provided so as to bring the elastic member 13 into pressure contact with the stopper 15. The coil springs 16 resiliently bias the insulator 11 (plate member 4) in a direction from the boss area 8 toward the airbag module 2. Consequently, the elastic member 13 in the insulator 11 is pressed toward the stopper 15 in the Z-axis direction.

Thus, the elastic member 13 is brought into pressure contact with the stopper 15. When the connector 12 is oscillated in the direction along the wheel surface, the pressure contact allows the elastic member 13 to buffer, absorb, and damp the movement of the stopper 15. In addition, slight displacement (vibration) of the connector 12 in the Z-axis direction is absorbed by the elastic member 13 in a pressure contact state so that the vibration is damped.

When a force to compress the coil springs 16 is exerted thereon, the plate member 4 is displaced toward the steering wheel 1 via the insulator 11. Accordingly, when each of the coil springs 16 is used as a horn spring, the plate member 4 is used as a horn plate, and a horn contact point is provided closer to the steering wheel 1, it is possible to configure a horn mechanism in which a horn is sounded by pressing the airbag module 2.

The insulator 11 includes a smaller-diameter portion 11b having a smaller inner diameter and located closer to the steering wheel 1 and a larger-diameter portion 11c having a larger inner diameter and located closer to the airbag module 2, which are arranged along the Z-axis direction. An inner diameter of the smaller-diameter portion 11b is set substantially equal to an outer diameter of the elastic member 13. An inner diameter of the larger-diameter portion 11c is set larger than the outer diameter of the elastic member 13. The ring 14 of the elastic member 13 is disposed in the larger-diameter portion 11c. The elastic member 13 is provided extensively in the smaller-diameter portion 11b and the larger-diameter portion 11c.

Between an inner peripheral surface of the larger-diameter portion 11c of the insulator 11 and an outer peripheral surface of the elastic member 13 each corresponding to a position of the ring 14 brought into slidable contact with the connector 12, a clearance C is set to permit, when the elastic member 13 is elastically deformed in the direction along the wheel surface in accordance with the oscillation of the connector 12, a predetermined amount of the elastic deformation. The clearance C is formed of an annular gap between the inner peripheral surface of the larger-diameter portion 11c and the outer peripheral surface of the elastic member 13.

The elastic member 13 is elastically deformed, in the clearance C, in the direction along the wheel surface to come into contact with the inner peripheral surface of the larger-diameter portion 11c. This allows the insulator 11 to restrict further elastic deformation of the elastic member 13.

In the smaller-diameter portion 11b at a position in the insulator 11 where the clearance C of the larger-diameter portion 11c is absent, a holding portion 17 is provided to hold the elastic member 13 with respect to the insulator 11. The holding portion 17 includes a plurality of elastically deformable protruding portions 17b provided in the smaller-diameter portion 11b so as to face a plurality of depressed portions 17a provided appropriately on an inner peripheral side of the elastic member 13 along a peripheral direction thereof and be fitted into the depressed portions 17a.

The elastic member 13 is inserted from the larger diameter portion 11c into the insulator 11 toward the smaller-diameter portion 11b, and a leading end of the elastic member 13 passes over the protruding portions 17b. As a result, the protruding portions 17b are fitted into the depressed portions 17a of the elastic member 13, and the depressed portions 17a are surrounded by the smaller-diameter portion 11b to allow the elastic member 13 to be held by the insulator 11.

The elastic member 13 has an annular tapered surface 13b facing the stopper 15. The annular tapered surface 13b is formed on an outer peripheral side of an end surface 13a to be brought into pressure contact with the stopper 15 by the coil springs 16. The annular tapered surface 13b forms a wedge-shaped gap E along the peripheral direction of the elastic member 13. The wedge-shaped gap E extends gradually further away from the stopper 15 in a radially outward direction of the elastic member 13. Accordingly, when the stopper 15 moves in a direction other than the Z-axis direction, the movement thereof is permitted by the gap E.

Figure 6:
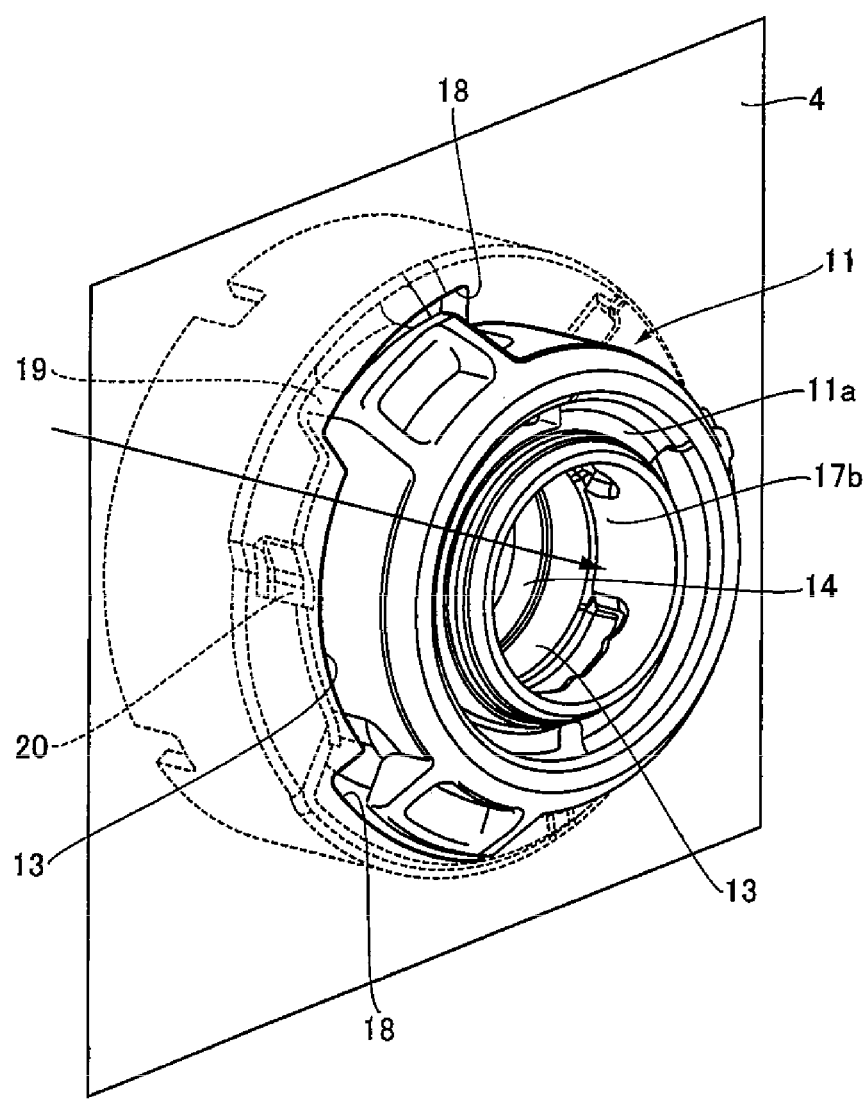
FIG. 6 is a perspective view illustrating attachment of the insulator of the embodiment shown in FIG. 2 to a plate member.
Figure 7:
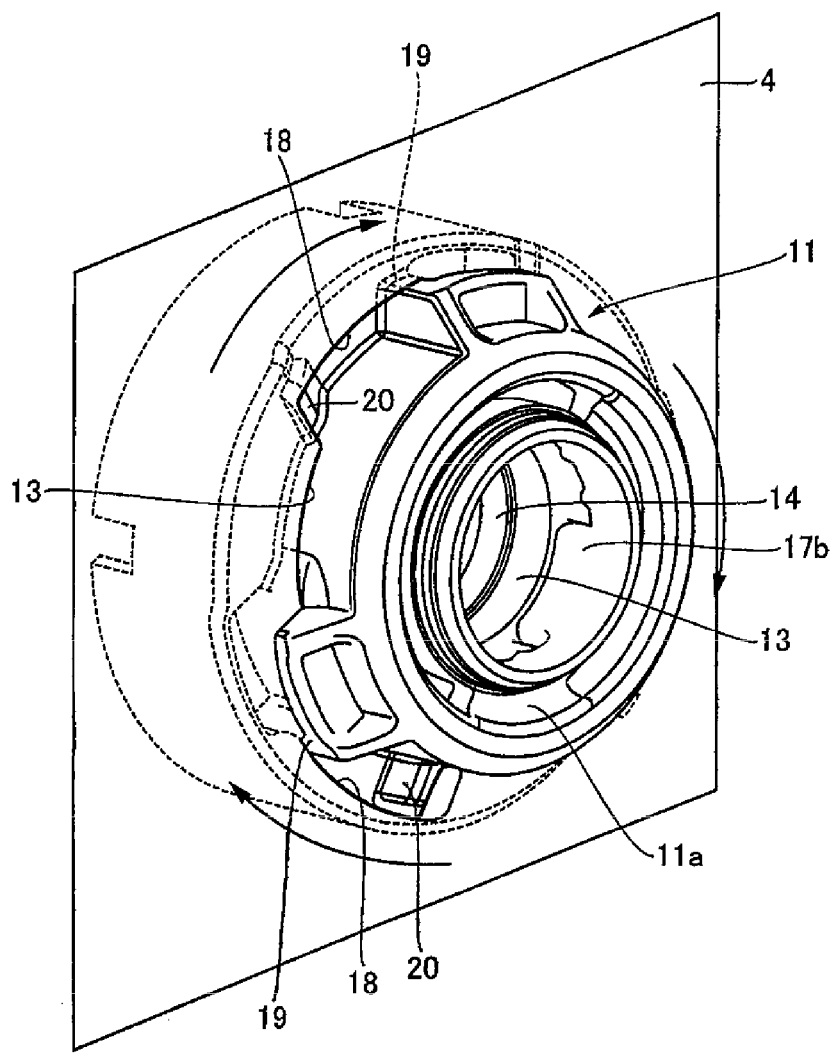
FIG. 7 is a perspective view illustrating the attachment of the insulator to the plate member, which is subsequent to FIG. 6.

In the plate member 4, as shown in FIGS. 6 and 7, a plurality of notched portions 18 are formed around each of the insertion holes 21 to be appropriately spaced apart from each other. Each of the notched portions 18 extends from the insertion hole 21 in the radially outward direction. Around the outer periphery of the insulator 11, a plurality of outwardly protruding restricted portions 19 are provided to be fitted and inserted into the individual notched portions 18.

The restricted portions 19 are formed at least in a peripheral direction (peripheral direction of the insertion hole 21) of the insulator 11 to have sizes smaller than those of the notched portions 18. This allows the restricted portions 19 to be movable in the peripheral direction in the notched portions 18.

The restricted portions 19 are moved in the notched portions 18 as the insulator 11 is operated to rotate in the peripheral direction in the insertion hole 21 along a plate surface of the plate member 4. The restricted portions 19 collide with the plate member 4 to have the movement thereof restricted.

Around the outer periphery of the insulator 11, outwardly protruding engagement portions 20 are formed adjacent to and spaced apart from the restricted portions 19 in the peripheral direction.

When the restricted portions 19 are moved in the notched portions 18 as the insulator 11 is operated to rotate, the engagement portions 20 are moved to slide along a back surface of the plate member 4. In response to the restriction of the movement of the restricted portions 19, the engagement portions 20 are fitted into and engaged with the notched portions 18 to partly come into contact with the back surface of the plate member 4 and thus fix the insulator 11 to the plate member 4.

The engagement portions 20 come off the notched portions 18 by, e.g., being pressed in the Z-axis direction or the like to allow the insulator 11 to be detached from the plate member 4.

Next, a description will be given of an effect of the damper structure provided in the steering wheel of a vehicle according to the present embodiment. When the damper structure is embedded in the steering wheel 1, each of the elastic members 13 integrally formed with the rings 14 is contained in the insulator 11 using the holding portion 17.

Next, into the insertion holes 21 of the plate member 4 to which the airbag module 2 is attached, the insulators 11 are inserted and fixed to the plate member 4 using the restricted portions 19 and the engagement portions 20.

Then, into the insulators 11, the connectors 12 are inserted from the airbag module 2 side and, from the steering wheel 1 side, one ends of the coil springs 16 are brought into contact with the spring sheets 11a of the insulators 11 such that the connectors 12 are surrounded by the coil springs 16.

Then, other ends of the coil springs 16 are brought into contact with the boss area 8 so as to cause the coil springs 16 to elastically support the plate member 4, and the connectors 12 are inserted into the boss area 8 of the steering wheel 1 to be connected and fixed thereto.

Resilient biasing provided by the coil springs 16 brings the elastic members 13 into pressure contact with the stoppers 15. Thus, the embedment of the damper structure between the steering wheel 1 and the airbag module 2 is completed.

The steering wheel 1 is three-dimensionally vibrated in an X-Y-Z-axis direction. The vibration of the steering wheel 1 is transmitted to the connectors 12 to also three-dimensionally vibrate the connectors 12.

When the connectors 12 oscillate in the direction along the wheel surface as the plane in the X-Y-axis direction, as shown in FIG. 3, the connectors 12 elastically deform the elastic members 13 in the direction along the wheel surface via the rings 14. An amount of the elastic deformation of each of the elastic members 13 is limited by the clearance C, and therefore it is possible to prevent excessive elastic deformation of the elastic member 13.

When the amount of the elastic deformation of the elastic member 13 is large (when the oscillation displacement of each of the connectors 12 is large) and the elastic member 13 fills up the clearance C and collides with the inner peripheral surface of the insulator 11, the vibration of the connector 12 is transmitted to the airbag module 2 via the plate member 4. The damping effect achieved by the airbag module 2 serving as the mass damper can damp (attenuate) the vibration of the steering wheel 1.

On the other hand, when the elastic deformation of each of the elastic members 13 occurs in the clearance C, the elastic deformation of the elastic member 13 buffers and absorbs the oscillation of the connector 12. This allows the vibration of the steering wheel 1 to be damped.

At this time, each of the connectors 12 is inserted into the insulator 11 with the gap A larger than the clearance C being formed between the insulator 11 and the connector 12. This keeps the oscillating connector 12 from coming into contact with the insulator 11 and can prevent noise resulting from a collision between the insulator 11 and the connector 12.

The vibration of the steering wheel 1 which oscillates each of the connectors 12 in the Z-axis direction can be damped by being buffered and absorbed by the pressure contact of the elastic member 13 with the stopper 15 of the connector 12 and by the attenuation of the resilience of each of the coil springs 16. In addition, by bringing the elastic member 13 into direct contact with the stopper 15, it is possible to directly adjust vibration frequencies intended to be removed using the rigidity and shape of the elastic member 13. This can remove clanging noise.

In addition, in the damper structure of the embodiment described above, each of the elastic bodies 13 has a hollow cylindrical shape and includes the annular tapered surface 13b forming the wedge-shaped gap E between the stopper 15 and the elastic member 13. This allows the vibration of the steering wheel 1 in the low-frequency region to be transmitted to the plate member 4 without interrupting the behavior of the connector 12.

Accordingly, it is possible to appropriately damp the vibration in the low frequency region using the airbag module 2 as a mass damper. The vibration of the steering wheel 1 in a relatively high frequency region can be buffered and absorbed by the elastic members 13 which are elastically deformed by the oscillation of the connectors 12.

Since the rings 14 which transmit the vibration (oscillation) of the connectors 12 to the elastic members 13 are provided integrally with the elastic members 13, it is possible to reduce the probability of noise which is assumed to be caused by providing the rings 14.

Since the holding portions 17 are caused to hold the elastic members 13 with respect to the insulators 11, it is possible to reduce the probability of noise assumed to be generated between these members as separate members.

The insulators 11 are attached to the plate member 4 such that, in response to the restriction of the movement of the restricted portions 19 in the notched portions 18, the engagement portions 20 are engaged with the notched portions 18 (plate member 4). Such a simple structure allows the insulators 11 to be reliably fixed to the plate member 4.

The foregoing description is given of the configuration in which the one ends of the connectors 12 are fixed to the boss area 8 of the steering wheel 1, while the other ends of the connectors 12 are inserted toward the plate member 4 attached with the insulators 11. However, needless to say, it may also be possible to adopt a configuration in which the insulators 11 are attached to the boss area 8, the other ends of the connectors 12 are fixed to the plate member 4 closer to the airbag module 2, and the one ends of the connectors 12 are inserted into the insulators 11 attached to the boss area 8.

The damper structure provided in the steering wheel of the vehicle described above is a preferred example of the present invention. Example embodiments other than that can also be implemented or carried out by various methods. The present invention is not limited to the shapes, sizes, configurations, arrangements, and the like of components shown in detail in the accompanying drawings unless particularly stated in this specification that the present invention is limited thereto. The expressions and terms used in this specification are intended for explanatory purposes, and are not limited thereto unless particularly stated that they are limited.

While the above description constitutes the preferred embodiment of the present invention, it will be appreciated that the invention is susceptible to modification, variation and change without departing from the proper scope and fair meaning of the accompanying claims.

The invention claimed is:

1. A damper structure provided in a steering wheel of a vehicle to damp vibration of the steering wheel using an airbag module serving as a mass damper, the damper structure comprising:
a plate member which is provided to be spaced apart from and face the steering wheel and adapted for attachment of the airbag module;
an insertion hole formed in the plate member;
a hollow cylindrical insulator inserted through the insertion hole and attached to the plate member;
a connector inserted into the insulator such that a gap is formed therearound to enable an oscillation at least in a direction along a wheel surface of the steering wheel by a vibration of the steering wheel;
an elastic member formed to have a hollow cylindrical shape and provided in the insulator so as to surround the connector, the elastic member formed with an inner periphery surface including a first area and a second area;
a ring provided to protrude from the first area of the elastic member such that the ring is provided between the elastic member and the connector, and the second area of the elastic member is spaced at a distance from an outer peripheral surface of the connector in the direction along the wheel surface, the ring being in slidable contact with the outer periphery of the connector to transmit the oscillation of the connector to the elastic member;
a disk-shaped stopper provided around an end of the connector so as to face the elastic member; and
a spring provided between the insulator and the steering wheel to resiliently bias the elastic member of the insulator so as to bring the elastic member into pressure contact with the stopper.

2. The damper structure provided in the steering wheel of the vehicle according to claim 1, further comprising:
a clearance set in association with the ring between an outer peripheral surface of the elastic member and an inner peripheral surface of the insulator to allow the elastic member to be elastically deformed only in a predetermined amount in the direction along the wheel surface in accordance with the oscillation of the connector;
a holding portion provided at a position in the insulator at which the clearance is absent to hold the elastic member with respect to the insulator;
a plurality of notched portions formed around the insertion hole of the plate member extending outwardly from the insertion hole;
a restricted portion provided around an outer periphery of the insulator so as to be inserted into the notched portions and movable in the notched portions as the insulator is operated to rotate in a peripheral direction in the insertion hole until movement of the restricted portions is restricted by the plate member; and
an engagement portion provided around the outer periphery of the insulator so as to be adjacent to the restricted portions and removably engaged with the notched portions in response to the restriction of the movement of the restricted portions to fix the insulator to the plate member.

3. The damper structure provided in the steering wheel of the vehicle according to claim 2 further comprising, wherein the holding portion is a protruding portion provided at the insulator so as to fit into a depressed portion formed on an inner peripheral side of the elastic member.

4. The damper structure provided in the steering wheel of the vehicle according to claim 1 further comprising, wherein the plate member is a horn plate.

5. The damper structure provided in the steering wheel of the vehicle according to claim 1 further comprising, wherein the spring is a horn spring.

6. The damper structure provided in the steering wheel of the vehicle according to claim 1 further comprising, wherein the ring is integrally formed with the elastic member.

7. The damper structure provided in the steering wheel of the vehicle according to claim 1 further comprising, wherein a plurality of the damper structures are provided for connection with the steering wheel.

8. The damper structure provided in the steering wheel of the vehicle according to claim 1, wherein the ring and the elastic member are each formed with a length along a Z-axis direction, and the length of the ring is smaller than the length of the elastic member in the Z-axis direction.

9. A damper structure provided in a steering wheel of a vehicle to damp vibration of the steering wheel using an airbag module serving as a mass damper, the damper structure comprising:
a plate member which is provided to be spaced apart from and face the steering wheel and adapted for attachment of the airbag module;
an insertion hole formed in the plate member;
a hollow cylindrical insulator inserted through the insertion hole and attached to the plate member, the insulator having an inner peripheral surface formed with a smaller-diameter portion and a larger-diameter portion;
a connector inserted into the insulator such that a gap is formed therearound to enable an oscillation at least in a direction along a wheel surface of the steering wheel by a vibration of the steering wheel;
an elastic member formed to have a hollow cylindrical shape and provided in the insulator so as to surround the connector;
a ring provided around an inner periphery surface of the elastic member and affixed to the elastic member, the ring being in slidable contact with an outer periphery of the connector to transmit the oscillation of the connector to the elastic member;
a clearance set formed of an annular gap between an outer peripheral surface of the elastic member and the inner peripheral surface of the larger-diameter portion of the insulator to allow the elastic member to be elastically deformed only in a predetermined amount in the direction along the wheel surface in accordance with the oscillation of the connector;
a disk-shaped stopper provided around an end of the connector so as to face the elastic member; and
a spring provided between the insulator and the steering wheel to resiliently bias the elastic member of the insulator so as to bring the elastic member into pressure contact with the stopper.

* * * * *